UNITED STATES PATENT OFFICE.

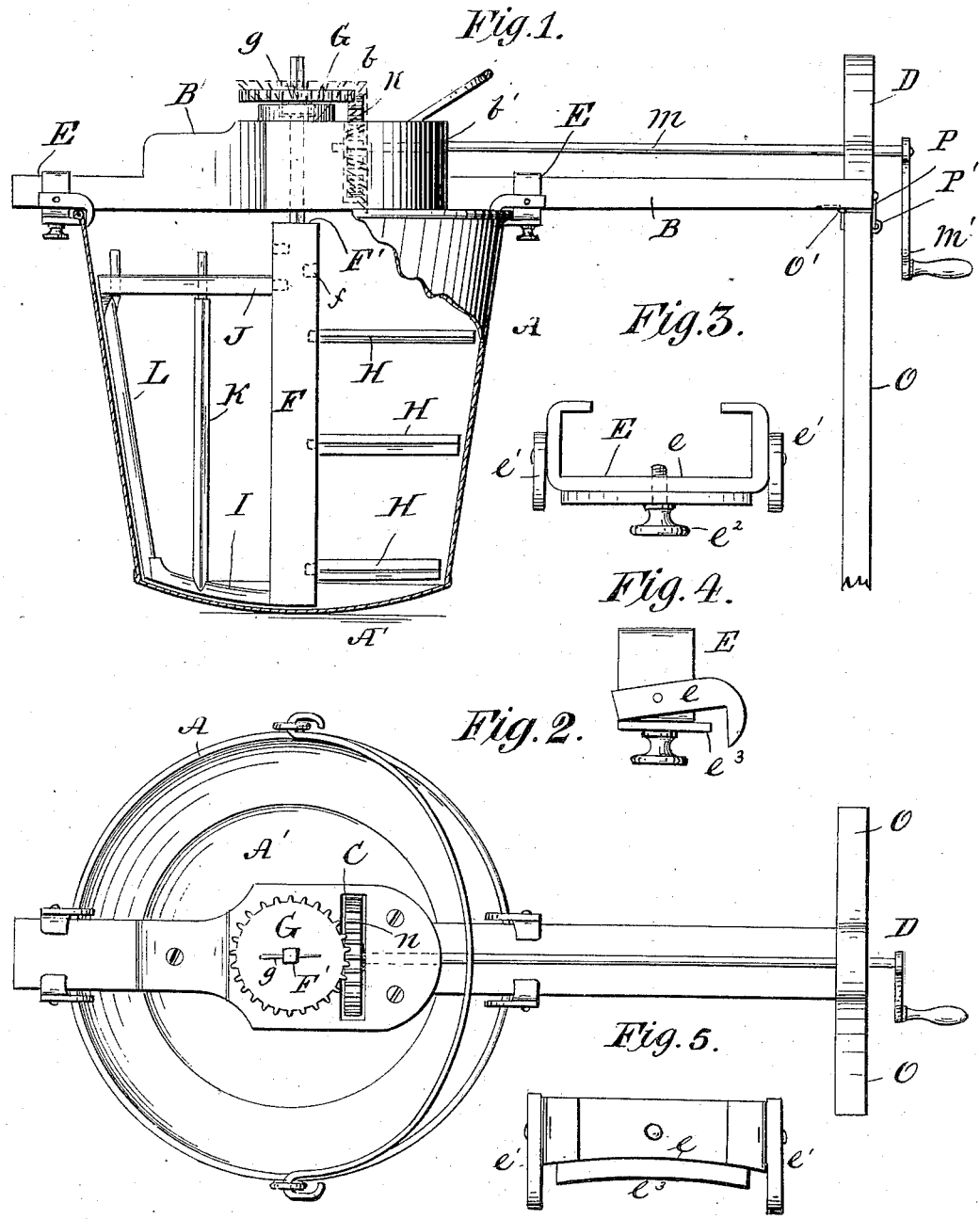

JOSIAH P. LUCAS AND JOHN M. LUCAS, OF CADIZ, OHIO.

FRUIT-BUTTER STIRRER.

SPECIFICATION forming part of Letters Patent No. 316,632, dated April 28, 1885.

Application filed February 26, 1885. (No model.)

*To all whom it may concern:*

Be it known that we, JOSIAH P. LUCAS and JOHN M. LUCAS, citizens of the United States, residing at Cadiz, in the county of Harrison and State of Ohio, have invented certain new and useful Improvements in Fruit-Butter Stirrers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention has for its object to provide an attachment which may be conveniently applied to any ordinary-sized kettle for the purpose of stirring the contents of such kettle. It is especially intended for use in the manufacture of fruit-butters—such as apple, quince, or peach butter—and operates in a manner more fully described hereinafter.

The invention consists in certain novel constructions, combinations, and arrangements of parts, which will be hereinafter described and claimed.

In the drawings, Figure 1 is a side view of my improvement applied to a kettle, the latter being partly in section. Fig. 2 is a plan view of the apparatus on a kettle. Fig. 3 is a front detail view, Fig. 4 a side view, and Fig. 5 a plan view, of one of the clamps.

The kettle A may be of any desired construction, and is usually formed with its bottom A' curved about as shown in Fig. 1.

The bearing-bar B is formed with a thickened portion, B', through which I form a vertical bearing, $b$, and a horizontal bearing, $b'$. The horizontal bearing extends nearly to the vertical bearing and opens into a vertical mortise C. This mortise C is formed from the upper side of the bearing-bar, and is closed at its lower end, for the purposes hereinafter described.

At its outer end the bearing-bar is provided with an upright, D, which is preferably formed with a bearing in line with the bearing $b'$, for the purpose of more firmly supporting the drive-shaft, presently described. This upright serves mainly as a handle by which the operator may firmly brace the bearing-bar in position in the use of the invention.

On the bearing-bar we arrange clamps E E, one each side of the portion B' of said bearing-bar. These clamps are formed in detail, as most clearly shown in Figs. 3, 4, and 5, and comprise clips $e$, hooks $e'$ on opposite sides of said clips, and a set-screw, $e^2$, turning through the bottom of the clip. The clip $e$ has a ledge or a shoulder-plate, $e^3$, which extends forward from its lower edge, as shown. This plate $e^3$ has its edge formed in a curve or concave conformed to the curvature of the kettle, as shown most clearly in Fig. 5.

In operation the clips are placed on the bearing-bar in the position shown in Figs. 1 and 2, and may be clamped in such position by turning the set-screw $e^2$ tightly up against the side of the bearing-bar. When so arranged, the ledge-plate $e^3$ fits under the wired rim of the kettle and holds the bearing-bar from vertical detachment. The hooks $e'$ extend over the rim of the kettle, resting close against the inner side of same, as shown in Fig. 1, and serve to prevent any lateral displacement of the bearing-bar in operation.

The stirrer has its shaft F provided at its upper end with a gudgeon, F', which journals in the bearing $b$, and extends above such bearing, and has its upper end made angular to receive the beveled gear-wheel G, which is placed on the upper end of the gudgeon F' and removably secured by means of a pin, $g$, or in other suitable manner.

The shaft F is provided in one side with radial breaking-bars H H, fitted into sockets $h$, as shown in dotted lines. These breakers may be suited in number to the depth of the contents of the vessel, and may for such purpose be removably secured in their sockets and removed and replaced as necessity may require. The shaft is also provided at its lower end with a scraper-bar, I, the under edge of which is conformed to the bottom of the vessel, so that as the shaft is revolved the bar will scrape the bottom of the kettle and prevent burning of the contents, which, as is well known, is the principal difficulty experienced in the manufacture of the article before referred to.

A bar, J, is projected from near the upper end of the shaft F, parallel with the scraper-bar I. These bars I and J serve as supports for the vertical bar K and the side scraper, L. The bar L is adapted to scrape the sides of the vessel, as will be seen. The bar J may be removably secured in its socket, so that it may be set lower or higher by removing it from one and inserting it in another socket to suit the height of the contents of the kettle.

By the several breaking and scraping bars it will be seen as the stirrer is revolved the contents will be thoroughly agitated and commingled, and all parts adhering to the bottom or sides of the vessel will be removed, so that we prevent the burning of the butter as long as the stirrer is kept in operation.

In the bearing $b'$ we journal the drive-shaft M, provided at its outer end with a hand-crank, M', or other expedient by which it may be revolved. On the inner end of the shaft M, and within the mortise C, we secure a beveled gear-wheel, N, fitted and arranged to mesh with the gear G, as will be understood from Figs. 1 and 2. As the shaft M is revolved, its motions are communicated by the gear N to the wheel G, and thereby to the stirrer.

It will be noticed that, by forming the mortise C and seating the gear N in such mortise, we obviate all drippings of oil or the products of friction into the butter.

To the outer end of the bearing-bar we hinge at O' a leg, O, which may be made of a suitable length for its lower end to rest on the floor when the kettle is placed on the stove, and we preferably flare the lower ends of said leg outwardly, as shown most clearly in Fig. 2, to provide a firm bearing on the floor.

A latch, P, usually of hook form, is secured on the end of the bearing-bar, and engages an eye, P', on the leg O, in order to hold the said leg firmly in the position shown in Fig. 1 when desired for use, and yet permit the said leg to be folded up against the bearing-bar when the device is not in use, in order to store the attachment in small space.

The upright D serves as a handle, it will be seen, on which the operator may press, and thereby firmly secure or hold the attachment while in use.

It may be desirable to form the leg O in sections, one adjustable longitudinally on the other, and provide a set-screw or other expedient by which to secure the said sections together in any desired adjustment. By thus forming the leg adjustable the attachment will be fitted for use on stoves of various heights.

It will be seen that we have provided a convenient construction which can be readily attached to any of the usual forms of kettles or readily detached therefrom at will.

When not in use, the clamps will be released, the retaining-pin $g$ removed, the shaft of the stirrer detached from the bearing-bar, and leg O folded up against said bearing-bar, when the entire apparatus may be stored in a small space.

We have shown the gears $g$ and $w$ as spur-gears in full lines. In practice we prefer and intend to make said gears bevel-gears, as will be understood from the dotted lines, Fig. 1.

Heretofore pot-stirring attachments have been provided embodying a bar having vertical and horizontal bearings, clamps for securing said bar to the vessel, an agitator, and a drive-shaft geared therewith, and we do not broadly claim such a construction as our invention.

Having thus described our invention, what we claim, and desire to secure by Letters Patent, is—

1. In a stirring attachment, the combination, with the bearing-bar, of the pail-clamps having arms embracing the bearing-bar and adjustable longitudinally thereon, whereby the attachment may be adjusted to different-sized pails, and clamps whereby said pail-clamps may be secured at any desired point, substantially as set forth.

2. The combination of the bearing-bar provided near one end with a thickened portion, B', a vertical bearing formed through the part B', a horizontal bearing formed in said part B' and terminating in a mortise, C, formed in the upper side of the part B', a stirrer journaled in the vertical bearing and provided with a gear-wheel, a drive-shaft journaled in the horizontal bearings and having a gear-wheel meshed with the gear on the stirrer and located within the mortise C, an upright, D, mounted on the outer end of the bearing-bar and provided with a bearing for the drive-shaft, a leg, O, pivoted to the bearing-bar, a latch by which to secure the said leg, and clamps adjustable on the bearing-bar, substantially as and for the purposes set forth.

3. The stirring attachment herein described, consisting of the bearing-bar provided with a vertical and horizontal bearing, the stirring-frame having its shaft journaled in the vertical bearing and provided with a gear-pinion, the horizontal shaft journaled on the bearing-bar and provided in its inner end with a gear meshed with the gear of the stirrer, a supporting-leg hinged to the outer end of the bearing-bar, a latch whereby to hold said leg at right angles to the bearing-bar, and clamps secured and adjustable on the bearing-bar, whereby to fit and clamp the device to various sized vessels, substantially as set forth.

In testimony whereof we affix our signatures in presence of two witnesses.

JOSIAH P. LUCAS.
JOHN M. LUCAS.

Witnesses:
D. CUNNINGHAM,
W. H. MCFADDIN.